US007680916B2

(12) United States Patent
Barnett et al.

(10) Patent No.: US 7,680,916 B2
(45) Date of Patent: Mar. 16, 2010

(54) SYSTEM FOR IMPROVING THE PERFORMANCE OF A COMPUTER SOFTWARE APPLICATION IN A SERVER NETWORK

(75) Inventors: Paul T. Barnett, Plano, TX (US); James Reynolds, Mt. Desert, ME (US)

(73) Assignee: Hyperformix, Inc., Austin, TX (US)

( * ) Notice: Subject to any disclaimer, the term of this patent is extended or adjusted under 35 U.S.C. 154(b) by 469 days.

(21) Appl. No.: 11/789,499

(22) Filed: Apr. 24, 2007

(65) Prior Publication Data

US 2008/0270526 A1    Oct. 30, 2008

(51) Int. Cl.
*G06F 15/173* (2006.01)
*H04J 3/22* (2006.01)

(52) U.S. Cl. ..................... 709/223; 370/468
(58) Field of Classification Search ................... 709/223
See application file for complete search history.

(56) References Cited

U.S. PATENT DOCUMENTS

| | | | | | |
|---|---|---|---|---|---|
| 5,961,594 | A | * | 10/1999 | Bouvier et al. | 709/223 |
| 6,615,166 | B1 | * | 9/2003 | Guheen et al. | 703/27 |
| 6,721,713 | B1 | * | 4/2004 | Guheen et al. | 705/1 |
| 2005/0114485 | A1 | * | 5/2005 | McCollum | 709/223 |
| 2005/0114739 | A1 | * | 5/2005 | Gupta et al. | 714/39 |
| 2006/0010101 | A1 | * | 1/2006 | Suzuki et al. | 707/2 |
| 2006/0053216 | A1 | * | 3/2006 | Deokar et al. | 709/223 |
| 2008/0270526 | A1 | * | 10/2008 | Barnett et al. | 709/203 |
| 2009/0070628 | A1 | * | 3/2009 | Gupta et al. | 714/26 |
| 2009/0138238 | A1 | * | 5/2009 | Bakshi et al. | 702/180 |

* cited by examiner

*Primary Examiner*—Firmin Backer
*Assistant Examiner*—James Edwards
(74) *Attorney, Agent, or Firm*—Shultz & Associates, P.C.

(57) ABSTRACT

Method and apparatus for separating background utilization from transaction resource consumption to simulate resource costs on system servers including a computer application server is taught. Transaction throughput combined with resource consumption data. Regression analysis on the resulting data set provides information useful for determining performance and for creating discrete event simulations. In a first embodiment, data from an application server is combined with the application transaction log to find a background utilization on the application servers and to simulate transaction resource cost with a background load. In a second embodiment, data from servers other than the application server are combined with the application transaction log to estimate the resource cost per transaction for a given resource in the system. In a third embodiment, data from servers other than the application server are combined with the application transaction log to simulate resource cost for a given resource based on transaction throughput.

21 Claims, 8 Drawing Sheets

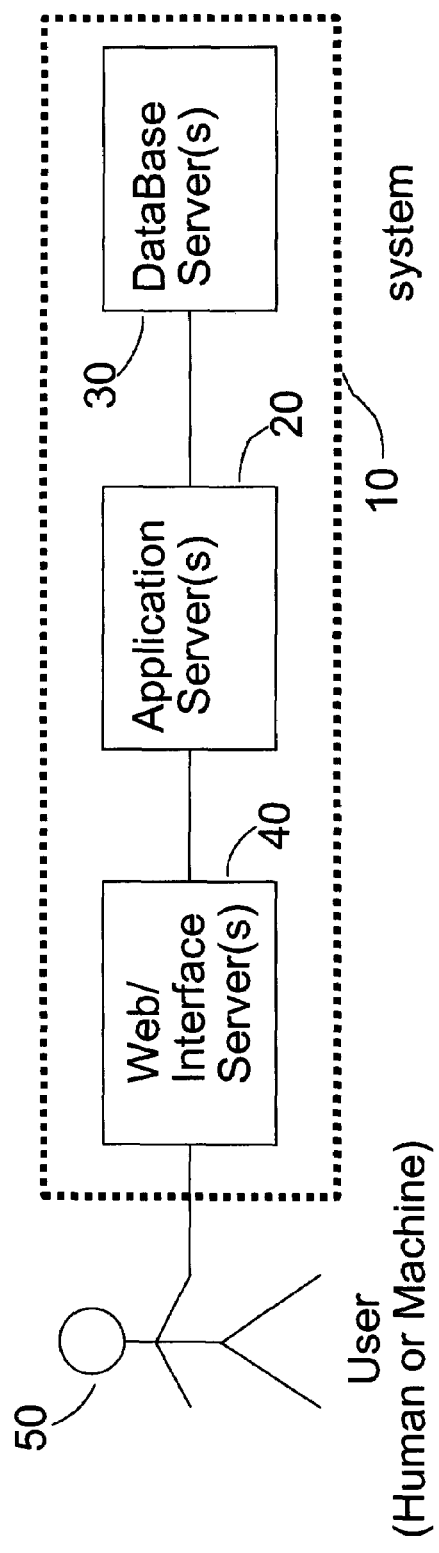
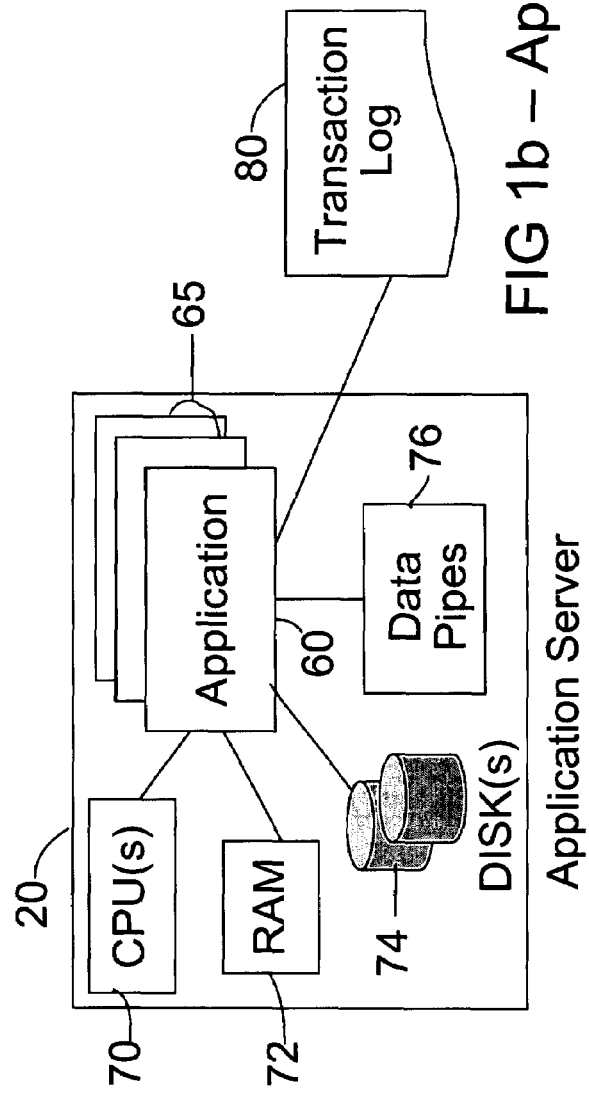

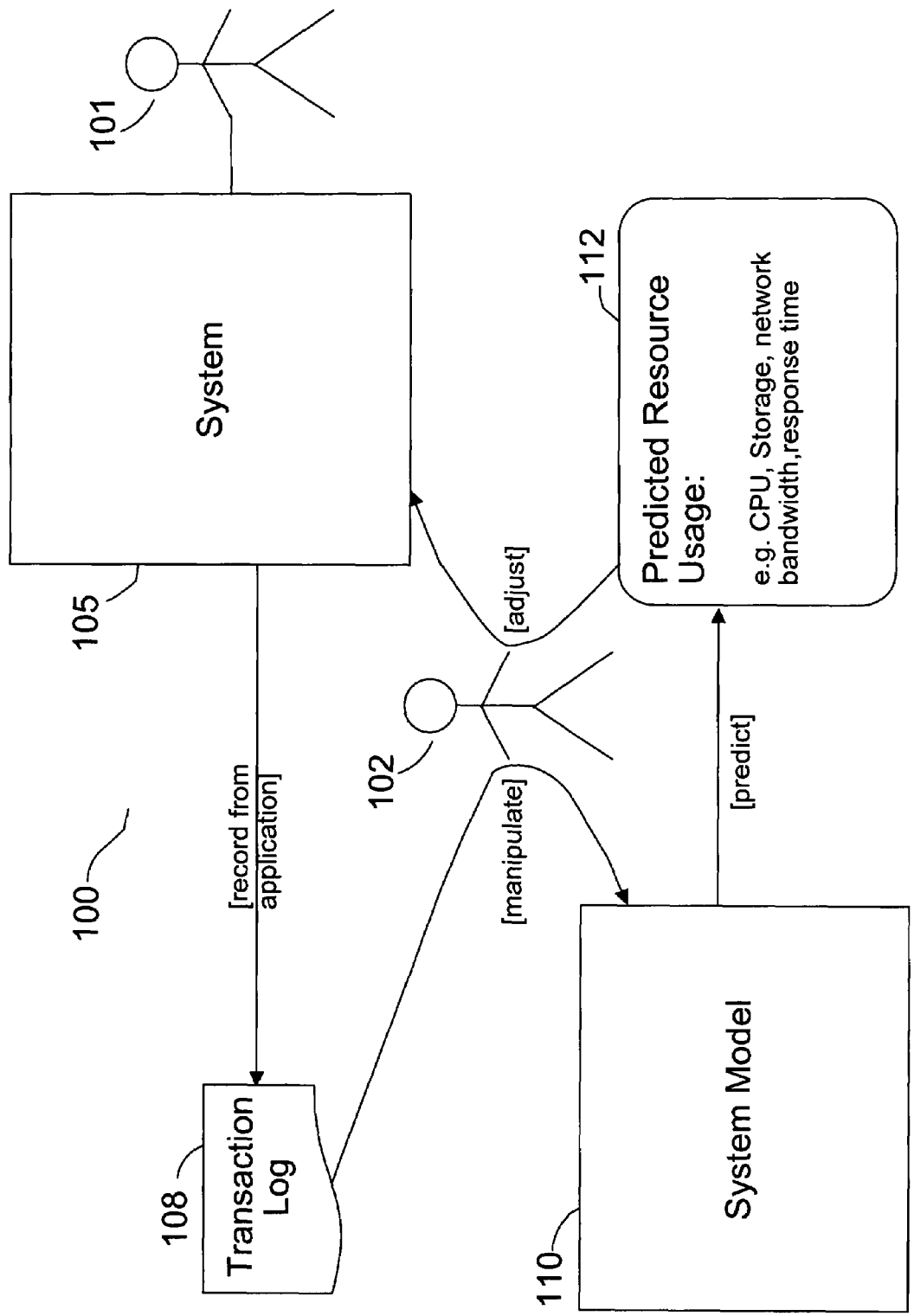
FIG 2 – Prior Art

Monitored System of Present Invention

Transaction Log

Present Invention Highest Level

1st Embodiment of Present Invention:
System Model Generator

2nd Embodiment of Present Invention:
System Model Generator

3rd Embodiment of Present Invention:
System Model Generator

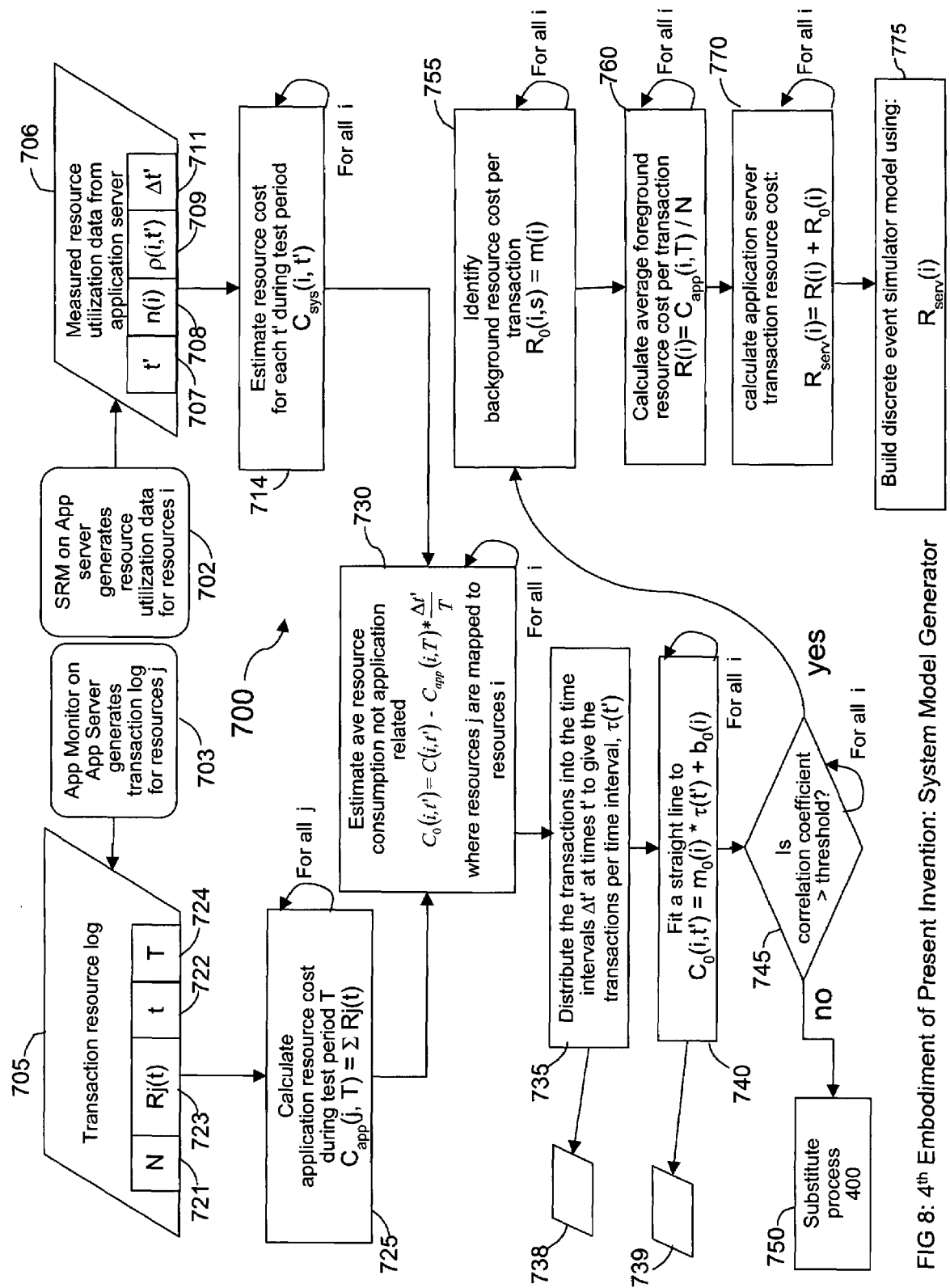
FIG 8: 4th Embodiment of Present Invention: System Model Generator

SYSTEM FOR IMPROVING THE PERFORMANCE OF A COMPUTER SOFTWARE APPLICATION IN A SERVER NETWORK

CROSS-REFERENCE TO RELATED APPLICATIONS

This application claims priority to U.S. patent application Ser. No. 10/354,230 filed Jan. 29, 2003, which claims priority to U.S. provisional patent application Nos. 60/376,613 filed May 1, 2002; 60/368,923 filed Mar. 29, 2002; 60/376,612 filed May 1, 2002; 60/372,846 filed Apr. 16, 2002; and 60/372,837 filed Apr. 16, 2002.

FIELD OF INVENTION

The present invention relates generally to the operation of computer software applications on a system of servers in an information systems environment. In particular, the invention relates to improving the performance of a given computer software application in the presence of other software applications executing on a system of servers.

BACKGROUND OF THE INVENTION

Information systems environments continue to grow more and more complex, especially in situations where a number of software applications are executing on the same network of servers, utilizing shared resources such as web servers or database servers to affect their respective functions. Moreover, a given application server may be dedicated to the execution of a number of software applications simultaneously, so that operating system resources are shared. The recent rise in popularity of virtual machines, wherein a single computer hardware platform simultaneously runs a plurality of operating systems, has certainly helped isolate computer software applications from one another, at least in their interaction with the operating system. But the given software applications may interact with similar resources on the network to which the application server is attached including its own CPU and memory subsystems, web servers, database servers, storage resources and network resources. System managers must understand the current performance of their applications in order to maintain quality end user performance, to be able to identify and predict future performance problems, to evaluate potential solutions to those problems and to proactively upgrade the systems.

To aid the system manager in this process, some software applications are instrumented to measure and report resource consumption for each transaction that is performed by the application. A transaction is typically an exchange of data with a given server or a given device with a well-defined beginning and end. The number of transactions per unit time will be referred to as the "load" or as the "transaction throughput" interchangeably in this document. If the transaction resource consumption data is logged sequentially in a file with the date and time that each transaction performed, one can analyze such data to generate a model that may be used to closely replicate the behavior of the software application. Two types of models commonly used in the art of information systems analysis are discrete event simulation models and analytic models based on queuing theory.

There is a significant drawback to the method of using resource consumption data from the given measured application: the generated model will only reflect resource consumption reported by the component of the given application that is measured. Resource consumption by unmeasured components of the application on the application server or on other servers will not be included in the generated model. Typical measured resource consumptions on the application server are the central processing unit (CPU) time, the storage disk bytes read and written, and data bytes read and written. As the combined application load for all applications on the server grows so will total resource consumption of all applications on the system of servers and the resources of all the components of the system will be drawn down. Application load then affects the performance of resources not measured by the given applications and skews the generated model. The usage of resources by applications other than the given application is referred to as the background load throughout the rest of this document.

The present invention can be used to determine the background load imposed by multiple other applications that were executing on the same hardware infrastructure during measurement. It is especially useful if the measurements are taken from a system in production that is shared with the other applications as they normally run.

The present invention incorporates resource utilization data collected by one or more system monitors such as the HP OpenView Performance Agent (available from Hewlett Packard Corporation), Microsoft Performance Monitor (available from Microsoft Corporation), or Unix System Activity Report (sar) into the generated model, so that simulation of unmeasured application components are either included in each transaction, or a background load is estimated and added into the model.

A prior art example of a system of servers containing an application server configured to measure its own resource consumption is shown in FIGS. 1A and 1B. The system of servers 10 of FIG. 1A comprises an application server 20 (or a set of application servers), a set of database servers 30 and a set of web-interface servers 40 interacting with a user 50, which may be human or machine. The servers included in system of servers 10 are connected together by a network indicated by the lines drawn between them. In FIG. 1B, software application 60 runs on application server 20 as do a set of other software applications 65. Software application 60 and set of other software applications 65 utilize resources contained within the application server 20, the resources being one or more CPUs 70, random access memory (RAM) 72, local data storage (DISK(s)) 74, and data pipes 76. A data pipe is a useful communications construct in various operating systems; examples of a data pipe are a data path between IP addresses on a network, a data path between two applications on the same server, or a data path to the display device.

User 50 interacts with application 60 on the application server to operate in production or to run a set of load tests on application 60. User 50 accesses and operates application 60 through web-interface server 40. While operating, application 60 measures resource consumption of the resources and writes the results of the measurements to transaction log 80.

Transaction log 80 containing measured transaction resource consumption data is comprised of a set of transactions generated by a given application and typically contains information as follows in the example shown in TABLE 1:

TABLE 1

Transaction Log

| Date/Time | Trans name | CPU (secs) | Disk Bytes Read | Disk Bytes Written | Data Bytes Received | Data Bytes Sent |
|---|---|---|---|---|---|---|
| 1/1/06 12:00:00 | Buy | 1.1 | 1038 | 38475 | 5069 | 12393 |
| 1/1/06 12:00:05 | Sell | 0.8 | 3847 | 58392 | 7378 | 17267 |
| 1/1/06 12:00:06 | Buy | 1.2 | 1057 | 38746 | 5182 | 12582 |

The transaction log organizes transactions into rows, each transaction characterized by a set of data organized into columns. In TABLE 1, the transaction log contains a Date/Time column which contains a time stamp of when the data for a given transaction was measured, a Transaction Name column which contains an alphanumeric descriptor of each transaction, a CPU consumption column containing CPU usage for each transaction, the number of Disk Bytes Read during each transaction, the number of Disk Bytes Written during each transaction, the number of Data Bytes Received from all data pipes during each transaction and the number of Data Bytes Sent to all data pipes during each transaction.

The transaction log from a load or stress test of an application or from an application deployed into production can have hundreds or even thousands of transactions during a measurement period of a few seconds.

Transaction logs may be generated by a software application for reasons other than performance monitoring, such as auditing, accounting, or recovery. But for measuring performance, the logs must contain a date/time stamp, the type and number of transactions performed (at that date/time), and the resource consumption relevant to the desired model.

Some software applications such as SAP have an embedded mechanism to add an extension to transaction processing, which is invoked at key points such as the completion of a transaction. If the required information is available at that time, this extension can be used to generate a transaction log without otherwise making changes to the application or underlying subsystem.

A discrete event simulation model can simulate each transaction as reported, at the time that it occurred. A more abstract model can be built by summarizing individual transactions into an average resource consumption per transaction, and simulate the average or peak throughput observed during the measurement period.

FIG. 2 shows a prior art performance improvement method 100 in which a generated model is used by the system manager to improve performance of an application in system operating a plurality of applications or services. A system of servers 105 is operated by user 101 to run a software application (not shown) residing on the system. The application measures transaction data and records measured transactions into transaction log 108. Transaction log 108 is manipulated by a system manager 102 to generate a discrete event simulation model 110 for a given system state different than existing state for system 105 when transaction log 108 was recorded. The given system state is often one in which the application is loaded with more users than in the existing state. Discrete event simulation model 110 outputs a predicted set of resource usage parameters 112 such as CPU utilization or network bandwidth required. Predicted resource usage parameters 112 are then used by system manager 102 to evaluate the performance of system 105 in the given system state and to make hardware or software adjustments on system 105 accordingly to prepare it for the given system state.

Transaction log 108 of the prior art may not include all of the resource consumption associated with a transaction. Consider again the simple 3-tier system of FIGS. 1A and 1B. Transaction log 80 generated by application server 20 would include only the resource consumption for that server. It will omit CPU time, for example, consumed by one of the database servers 30, even when the server is called by application 60. There is insufficient knowledge to accurately model the performance of application 60, especially in a situation when database server 30 is heavily loaded by requests from other running applications, many of which may be anonymous or do not generate their own transaction log. In modern systems, a plurality of applications will typically run on a plurality of real or virtual machines.

There exists a need in the art of systems management for a performance tool to aid the system manager in the common situation where there is incomplete knowledge of application resource usage by applications other than the application of interest.

There also exists a need for a method for measuring and combining system wide utilization data with the application transaction log to provide accurate performance models. More specifically, by making an assumption that the transaction throughput derived from the application transaction log is also representative of the transaction throughput for all other system components of the application (e.g. web server and database server in FIG. 1a), throughput data can be combined with resource utilization data collected during the same period from the other system components to estimate unknown transaction costs.

There also exists a need for a method by which data from the application server alone can be gathered and combined with the application transaction log to make a significant improvement in the performance model.

SUMMARY OF THE INVENTION

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention. Copyright protection is claimed to the extent that copyright law covers this disclosure.

It is an object of the present invention to provide a system for improving the performance of a computer application wherein the computer application operates as a software program on a system of servers configured to operate other software programs simultaneous to the computer application. The system of servers includes a set of application servers which are connected to a set of networked servers by a communications network, and wherein the computer application utilizes a set of local resources connected to the set of application servers, and wherein the computer application utilizes a set of remote resources connected to the set of networked servers. The set of local resources contains a local CPU resource for executing software programs, a local RAM resource for storing software programs and for storing dynamic data, a local data storage resource for storing persistent data, and a local data pipe resource for communicating with the other software programs on the system of servers via transactions. Transactions are an exchange of data associated with the computer application, wherein a given networked server services transactions communicated from the set of application servers and services requests from other servers in the set of networked servers. The communicated transactions and requests cause usage of the set of remote resources on the given networked server. The set of remote resources contains a remote CPU resource for executing software programs, a remote RAM resource for storing software programs and for storing dynamic data, a remote data storage resource for storing persistent data, and a remote data pipe resource for communicating with other servers in the set of networked servers and with other servers in the set of application servers. A transaction log associated with the computer application contains a list of transaction information measured by the computer application, the transaction information for a given transaction describing resource usage by the computer application during the period of time that the transaction occurs. Furthermore, a set of system resource monitors (SRM) reside on the system of servers, each SRM associated with a given server in the system of servers, each SRM operating as a software program residing on and being executed by the server to which the SRM is associated, a given SRM generating resource utilization data for the resources of the server to which the SRM is associated, the resources being local resources if the server is in the set of application servers and the resources being remote resources if the server is in the set of networked servers.

In a preferred embodiment of the present invention, the system for improving performance comprises a performance criteria describing an expected resource utilization of the computer application in a given configuration of the system of servers, the given configuration of the system of servers being a defined set of local resources associated with a defined set of application servers, a defined set of remote resources associated with a defined set of networked servers, and a defined set of software programs operating on a defined system of servers.

The system for improving performance additionally comprises a system resource utilization data repository for storing and organizing the resource utilization data generated by the set of SRMS, the system resource utilization data repository residing on and operating on one server in the system of servers.

The system for improving performance includes a novel system model generator residing on and operating on one server in the system of servers, the system model generator functioning to generate a discrete event simulation of the computer application from the system resource utilization data repository and from the transaction log, the discrete event simulation capable of simulating the transactions associated with the computer application and further capable of creating predicted resource utilizations for the given configuration of the system of servers which are predictions of the local resource utilizations of servers within the set of application servers and the remote resource utilizations of servers in the set of networked servers.

Within the system for improving performance in the preferred embodiment of the present invention, a set of predicted resource utilizations is created by the discrete event simulation and used for altering the configuration of the system to meet the performance criteria.

Within a preferred embodiment, a method is provided for improving performance comprises the following steps.

A first step of causing the computer application to run under a set of load conditions, a load condition being the rate at which the application is invoked.

The method comprises the second step of collecting a transaction log from the computer application, the transaction log containing a list of transactions generated by the computer application and containing information about the usage of resources during the period of time the transaction occurs.

The method comprises the third step of collecting system resource utilization data from a set of system resource monitors attached to servers in the system of servers and storing the utilization data into a system resource utilization repository.

The method comprises the fourth step of generating a system model by combining the information contained within transaction log with the information contained within the system resource utilization data repository.

The method comprises the fifth step of running the discrete event simulation to predict resource usage by the computer application on the given configuration of the system of servers.

The method comprises the sixth step of comparing the predicted resource usage of the computer application to a desired performance criteria. If the desired performance criteria are met then changing the system of servers to the given configuration.

The system model generator method in the fourth step above further comprises a set of steps according to the following description.

System resource utilization data in the preferred embodiment of the present invention contains a set of measured resource utilizations, $\rho(i, t')$, measured at a set of times t' over time interval $\Delta t'$ for system resources i contained within the set of local resources and where any given local resource is comprised of a plurality of n(i) entities. Furthermore the transaction log in the preferred embodiment of the present invention contains a set of measured resource costs $R_j(t)$ corresponding to a set of transactions occurring at a plurality of times t and for system resources j contained within the set of local resources.

With the system resource utilization data, the system model generator computes the resource cost $C(i, t')$ for all system resources i. The next step sets the total system resource cost $C_{sys}(i, T)$ for each system resource i for a given test period T equal to the sum of resource costs $C(i,t')$ for all the time intervals contained within the test period T.

The next step is to compute the total application resource cost $C_{app}(j, T)$ during the test period T.

The next step estimates the average background resource consumption, $C_0(i, T)$, for each system resource i consumed during test period T as the difference of $C_{sys}(i,T)$ and $C_{app}(j,T)$ and where a given system resource j in the transaction log is identified as a given system resource i in the resource utilization data.

The preferred method includes of assuming a constant background utilization for the set of application servers and calculating a constant background load value $\rho_0(i)$ for each system resource i measured during the test period T.

These and other preferred embodiments are described further herein.

BRIEF DESCRIPTION OF THE DRAWINGS

FIG. 1A is a block diagram of a system of servers in the prior art.

FIG. 1B is a block diagram of an application server generating a transaction log within a system of servers in the prior art.

FIG. 2 is a block diagram of a prior art process wherein a system manager improves performance of an application using a transaction log.

FIG. 8 is a flow chart describing the system model generator of the fourth embodiment of the present invention.

DETAILED DESCRIPTION OF EXEMPLARY EMBODIMENTS

The present invention is described in this specification in terms of systems and methods for system performance management. Persons skilled in the art, however, will recognize that any computer system that includes suitable programming means for operating in accordance with the disclosed methods also falls well within the scope of the present invention. Suitable programming means include any means for directing a computer system to execute the steps of the method of the invention. The invention may also be embodied in a computer program product, such as a diskette, CD, DVD, removable storage device, networked program or other recording medium, for use with any suitable data processing system. Although the exemplary embodiments described in this specification are oriented to software installed and executing automatically on computer hardware, alternative embodiments may be implemented manually by hand or semi-manually by the use of a spreadsheet or electronic calculator and are within the scope of the present invention.

Figure 3A:
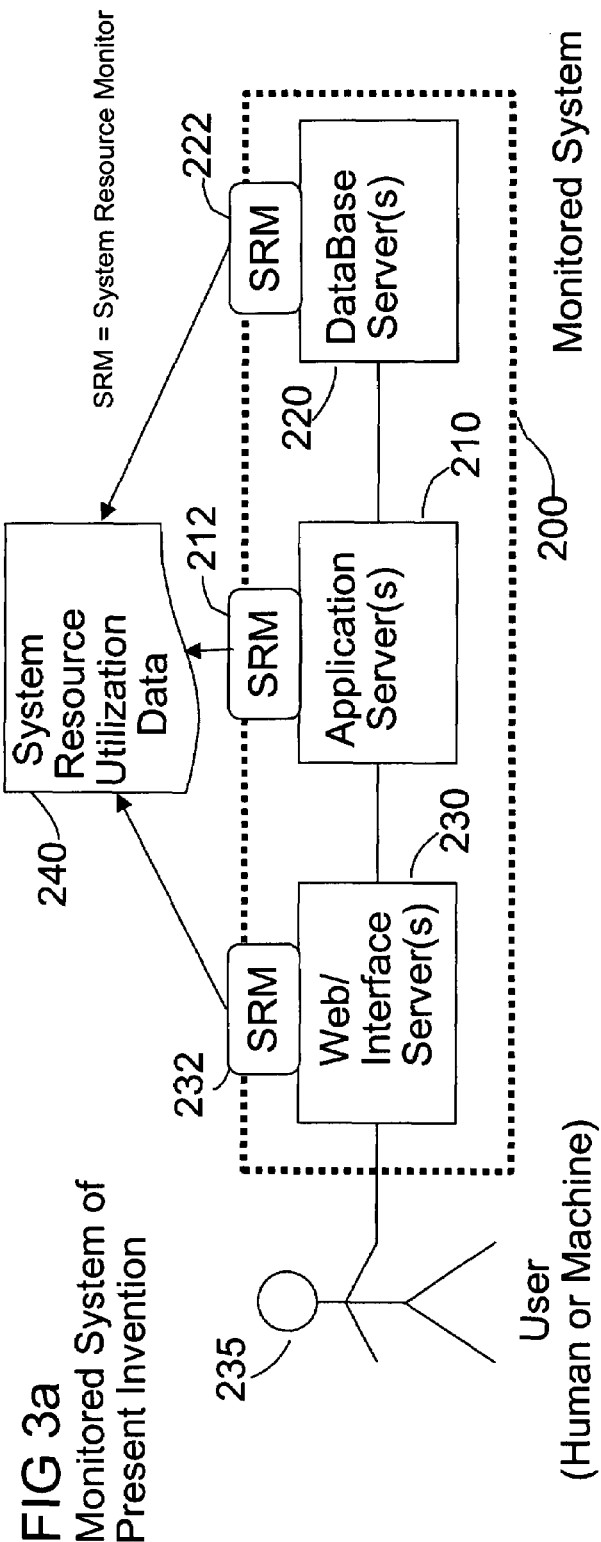
FIG. 3A is a block diagram of a system of servers in the context of the present invention.
Figure 3B:
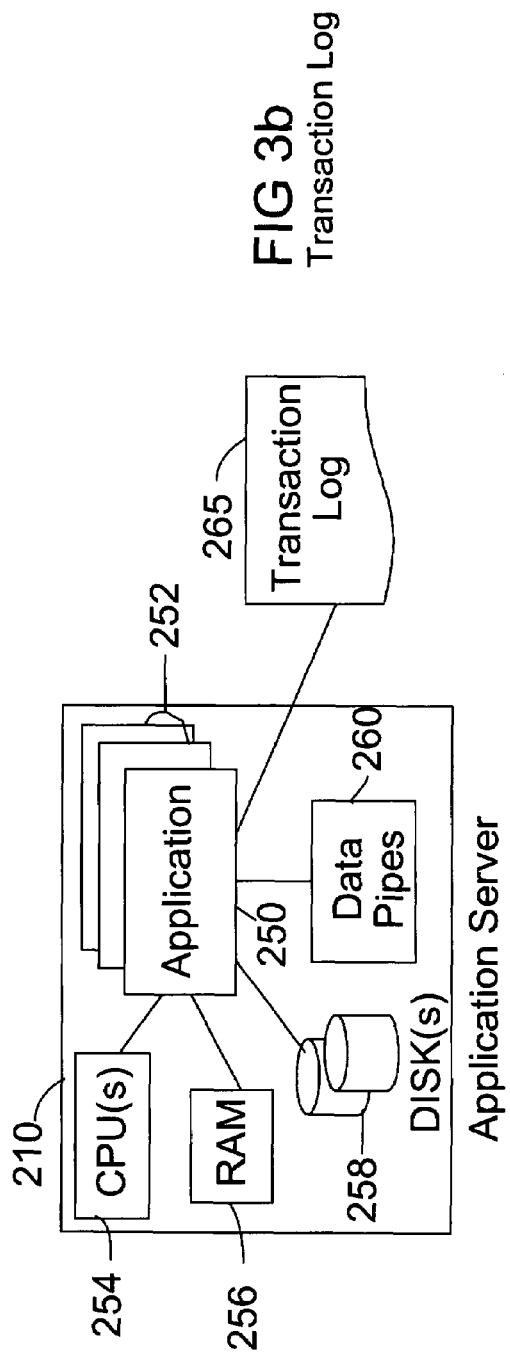
FIG. 3B is a block diagram of an application server showing the generation of a transaction log in the context of the present invention.

The present invention is understood in the context of a practical computer application which operates on a system of networked servers. FIG. 3A shows a system of servers 200 comprising a set of one or more application servers 210, a set of one or more database servers 220 and a set of one or more web-interface servers 230 connected by a network between each server indicated by the lines drawn between them. The network may be a local area network (LAN) at one physical location or a wide area network (WAN) between a plurality of LANS at different physical locations, the WAN utilizing public or private network transmission facilities which may be global in extent. Turning to FIG. 3B, software application 250 is executed (runs) on application server 210; a set of zero or more other software applications 252 also run on application server 210. Software application 250 and set of other software applications 252 utilize resources contained within application server 210, the resources being one or more CPUs 254 for processing software code instructions, random access memory (RAM) 256 for storing code instructions and data, local data storage (DISK(s)) 258 for persistently storing data, and data pipes 260, a data pipe being a communications channel opened to another program or device in application servers 210 or on the system network; examples of the data pipe being a TCP/IP session between IP addresses on a network, a data stream between two applications on the same server, or a data stream to a display device. Software application 250 and other applications 252 may also utilize system wide resources, namely web-interface servers 230 and database servers 220.

User 235, which may be a human or a machine, interacts with application 250 on application server 210 to operate in production or to run a set of load tests on application 250. User 235 accesses and operates application 250 through web-interface servers 230. In production there may be a plurality of users interacting with application 250 via web-interface servers 230. Additionally, a plurality of users (not shown) may operate an unknown number of instances of other applications 252 or run queries or other operations on database servers 220 or web-interface servers 230 simultaneous to the operation of application 250 by user 235. User 235 or the plurality of users may use LAN or WAN facilities as described above to perform the interaction with any given server in the system of servers 200. While in operation, application 250 measures resource consumption of its local resources and subsequently writes the results of the measurements to transaction log 265.

In the exemplary embodiment of the present invention, other performance measurements are allowed for besides those which are measured by application 250 and written in transaction log 265. Continuing again with FIG. 3A, each of web-interface servers 230, application servers 210 and database servers 220 have associated respective system resource monitors (SRM) 232, SRM 212 and SRM 222. Examples of SRMs used in the present context are the HP OpenView Performance Agent, Microsoft Performance Monitor, or System Activity Report (sar). SRM 212, SRM 222 and SRM 232 periodically measure overall utilization of various resources on their respective servers, resources such as CPU utilization, local disk utilization and network utilization. The measurements are time stamped and logged internal to each system performance monitor but may be concatenated into system wide resource utilization data 240 by a specialized external application (not shown) that acts to create a system-wide performance repository. An example of such a specialized external application is the Hyperformix IPS Data Manager available from Hyperformix, Inc. of Austin, Tex., which automatically collects, normalizes, synchronizes and validates heterogeneous data sources and acts as a central repository for performance data.

System wide resource utilization data 240 may be gathered by the external application through polling the given SRMs or by programming the given SRMs to push their data periodically to the external application. Table 2 shows an example of resource utilization for a particular server, a web-server:

TABLE 2

Example of Resource Utilization Data associated with a system component

| Time | CPU Utilization | Disk Read Ops/sec | Disk Read Bytes/sec | Disk Write Ops/sec | Disk Write Bytes/sec | Network Bytes Sent/sec | Network Bytes Received/sec |
|---|---|---|---|---|---|---|---|
| 13:20:00 | 15.3% | 10.2 | 30,294 | 2.3 | 10,358 | 3,390 | 8,592 |
| 13:21:00 | 45.2% | 30.9 | 103,003 | 10.2 | 95,085 | 6,300 | 10,385 |
| 13:22:00 | 35.3% | 25.0 | 85,938 | 7.9 | 75,395 | 2,390 | 7,699 |

Note that resource utilization data is measured periodically over pre-defined time intervals Δt, the time intervals being equal to 60 seconds (1 minute) in the example of Table 2. Resource utilization data contains the percent resource consumption of some resources such as the CPU resource and the throughput of all other resources, as shown in Table 2; throughput being defined as some number of operations per unit time performed. CPU utilization is the average consumption of CPU time during the time interval Δt and is the average ratio of CPU time requested of all operations on that server to the maximum acquirable CPU time expressed in percent, given the known CPU performance. Disk read (or write) operations per sec is the average number of disk read (or write) operations per sec during the time-interval Δt. Similarly, disk read (write) bytes per sec is the average number of disk bytes read (or written) to (from) storage devices per sec during the time-interval Δt. Network bytes read (written) per second is the average number of bytes read (or written) to (from) the network per sec during the time-interval Δt.

Figure 4:
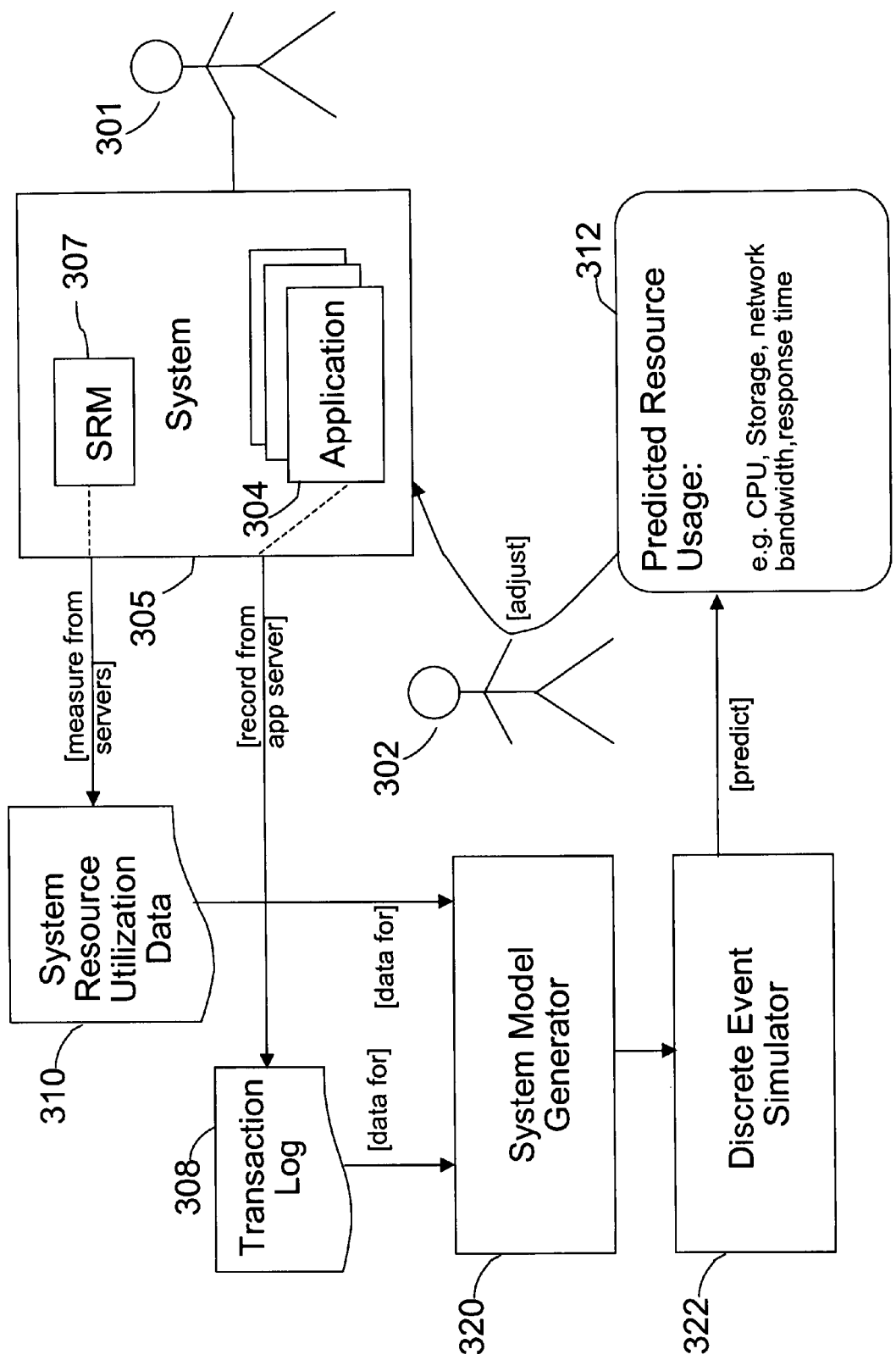
FIG. 4 is a block diagram of the performance improvement process of the exemplary embodiment of the present invention.

FIG. 4 is a block diagram showing a preferred embodiment of the present invention used by a system manager to improve the performance of a given application within a system of servers running a plurality of applications. A system 305 of servers and applications is operated by user 301 to run software application 304 residing on system 305. System 305 is managed by system manager 302 meaning that system manager 302 is tasked with maintaining system 305 performance under various load conditions as they arise over time. Software application 304, while operating during a given period of time, measures transaction data and records measured transactions into transaction log 308. During the given period of time, a set of one or more system resource monitors 307 measure resource utilizations which are transferred to a system resource utilization data file 310. The hardware and software configuration and application loads of system 305 during this period of time defines an existing system state under which the measurements are made. Transaction log 308 and resource utilization data file 310 are manipulated by system model generator 320 to generate a discrete event simulation by discrete event simulator 322 which is used to model a new system state different than existing system state for system 305.

The new system state is often a state in which the application load is changed, for example, more users of application 304 than in the existing state. In another situation, multiple applications are consolidated onto a single hardware platform operating individual services on multiple virtual machines running simultaneously on the hardware platform. A situation may arise where more servers are required in the new system state. Another common example arises when existing servers are substituted with new ones that have different (typically better) performance characteristics such as faster CPUs, more CPUs, or more RAM. In yet another example, the network configuration may change, with the potential of impacting bandwidth or response time. The system manger desires to predict system behavior under new system states observed under known input conditions. A discrete event simulation model provides a means of observing the new system state and predicting system behavior.

Returning to the discussion of FIG. 4, discrete event simulator 322 provides a predicted set of resource usage parameters 312 such as CPU utilization or disk throughput required for the new system state. Predicted resource usage parameters 312 are then used by system manager 302 to evaluate and predict the performance of system 305 in the new system state and to make hardware or software adjustments on system 305 accordingly to prepare it for the new system state. An example of a discrete event simulator is the IPS Performance Optimizer, available from Hyperformix, Inc. of Austin, Tex.

In another embodiment of the present invention, discrete event simulation model 322 is replaced by an analytical model based on queuing theory to predict the performance of the new system state.

Figure 5:
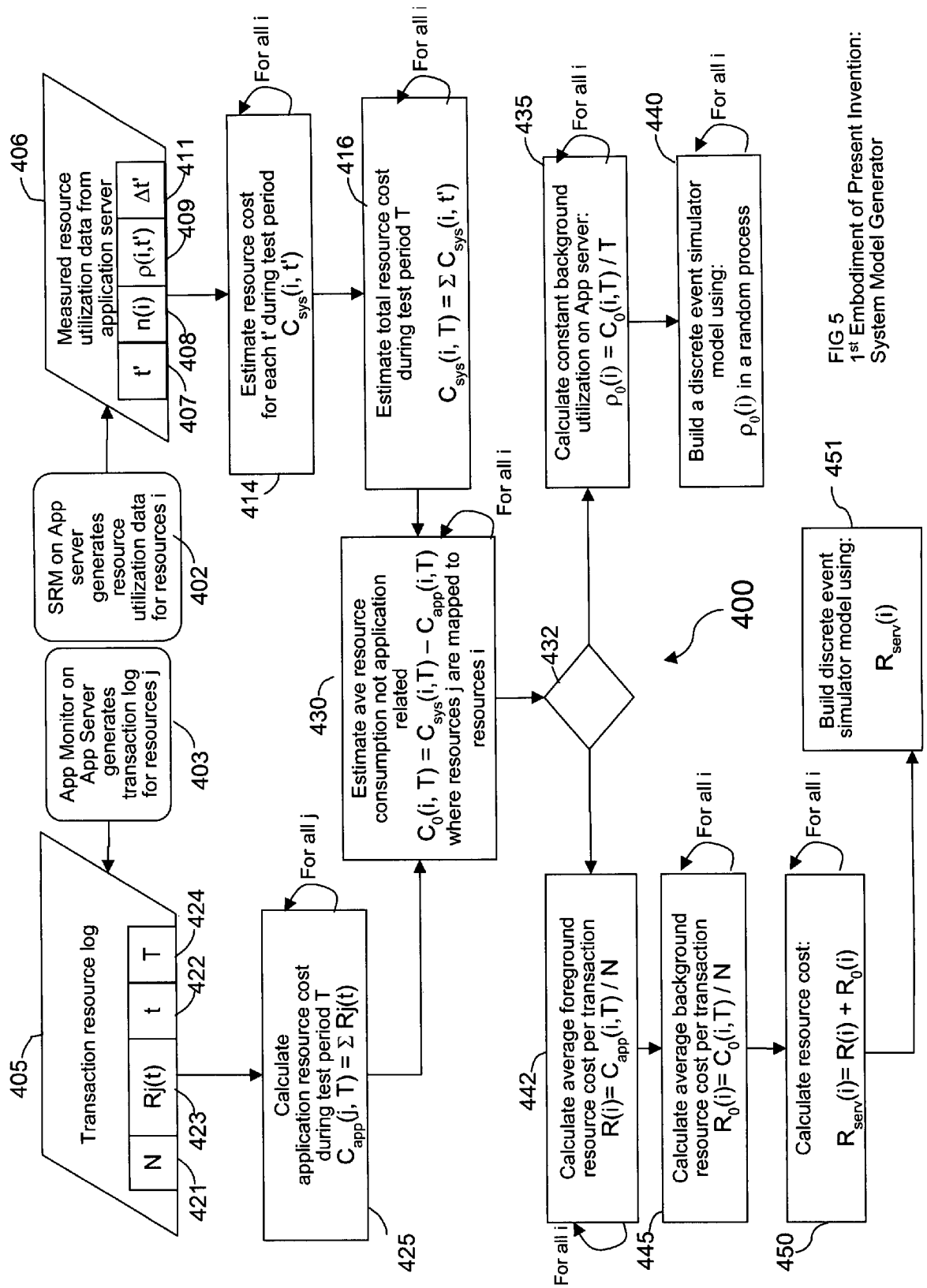
FIG. 5 is a flow chart describing the system model generator of the first embodiment of the present invention.

System model generator 320 of the present invention can be realized in a number of preferred embodiments, a first preferred embodiment being shown in the flow chart of FIG. 5. The flow chart describes a system modeling process 400 wherein a set of one or more SRM(s) exist on a given application server. In measurement step 402, SRM(s) generate measured resource utilization data 406 for the given application server only. Typically there is one SRM in this situation, but there may be multiple, even unknown, applications running on the same application server. In addition to SRM(s), the software application to be modeled generates transaction log 405 in transaction log generation step 403. Transaction log 405 will describe transactions occurring in a given test period labeled as T in step 424.

Resource utilization data 406 contains time stamps 407 associated with periodic resource measurements, the measurements being made in time intervals 411, labeled as Δt'. Measured resource utilization 409 is also contained in resource utilization data 406 and is designated by $\rho(i, t')$ where the index i refers to a specific system resource, such as a CPU on a specific server. It is possible for some resource utilizations to be spread across multiple devices, for example in a server that has 2 CPUs. Resource utilization data 406 contains the number of unit resources 408 designated by n(i).

In step 414 of process 400 resource cost is computed for all system resources i. Resource cost is the amount of resources consumed in a time interval and is given by:

$$C(i,t')=\rho(i,t')\cdot \Delta t'\cdot n(i)$$

Using the data from Table 2 as an example, CPU utilization is 15.3% in the first time interval. The resource cost for the CPU in the first time interval is then $$C_{CPU}(13.20.00)=15.3\%\cdot 60\text{ seconds}\cdot 1\text{ CPU}=9.18 \text{ CPUseconds}$$

and similar for the other time intervals.

In step 416 of process 400, total system resource cost for each resource i is computed for test period T by summing the resource cost for all the time intervals contained within the test period. This step can be expressed as:

$$C_{sys}(i, T) = \sum_{T} C_i(i, t')$$

Again, using the data from Table 2 as an example, total CPU utilization for the application server is $$C_{sys}(CPU,T=3\text{ min})=9.18+27.12+21.18=57.48 \text{ CPU-seconds.}$$

Turning back to the transaction resource information, transaction log 405 contains a record of all transactions occurring during the test period T so that a certain number of transactions 421, labeled as N, are logged during time T. Each transaction is comprised of time stamp 422, labeled t, and a list of resource costs for the transaction 423, labeled $R_j(t)$, where j is an index describing the system resource used. Note that the transaction times t are not periodic like the resource utilization measurement times t' and in general the two time series are not in synchronization with another. A subset of resource utilization times t' is contained within the test period T.

The next step in the process 400 related to transaction processing is step 425 to calculate the total application resource cost which is the total resource usage by the application during the test period T. Total application resource cost $C_{app}$ is computed as:

$$C_{app}(j, T) = \sum_T R_j(t).$$

The process 400 continues with step 430, wherein the data from steps 416 and 425 are combined to estimate the average background resource consumption, $C_0$, during test period T not related to the given software application or not measured by the given software application. The calculation proceeds as follows:

$$C_0(i,T) = C_{sys}(i,T) - C_{app}(i,T)$$

where a specific resource j in the transaction log is identified in the present step 430 as a specific system resource i in the resource utilization data.

An example of steps 416, 425 and 430 is conceived as follows. Suppose that the application reports a total CPU usage for 1000 transactions occurring during the T=3 min time period as 39.48 CPU seconds so that $C_{app}$(CPU, T)=39.48 CPU seconds. Subtracting $C_{app}$(CPU, T) from $C_{sys}$(CPU, T) gives $C_0$(CPU, T)=57.48−39.48=18.0 CPU seconds of unreported CPU usage in the 3 minute period.

The step 432 is a decision step for a process branch decision which can be made manually at the time of the process execution or it can be made before the process is run, for example, by using a default setting. Step 432 decides to execute step 435, to execute step 445 or to execute both step 435 and step 445, the details of the function of step 435 and step 445 to be given below.

Step 435 assumes a constant background utilization occurring on the application server and calculates constant background load, $\rho_0(i)$, for each resource i by $\rho_0(i) = C_0(i,T)/T$. It is readily seen that $\rho(i)$ describes an average background resource cost per unit time (background load) which may be multiplied by a given time interval to estimate the total background resource usage during that time interval. Background utilization generally occurs due to operating system overhead or other application load. From the previous example, $\rho_0$(CPU)=(18 CPU seconds/180 seconds)=10% CPU background load utilization.

The step 440 uses the resulting background load $\rho(i)$ for a given resource i and to build a discrete event simulator model that simulates the server background load for a given resource i as a random process with mean value of $\rho(i)$. The discrete event simulator model is then submitted to discrete event simulator 322.

Step 442 calculates an average foreground resource cost per transaction on the application server, $R(i) = C_{app}(i,T)/N$, for all resources i associated with the application server, where $C_{app}(i, T)$ is the result from step 425, N is the number of transactions 421 in the test period T, and where the resource j has been identified as resource i as in step 430.

Step 445 calculates an average background resource cost per transaction on the application server, $R_0(i) = C_0(i,T)/N$, for all resources i associated with the application server, where $C_0(i,T)$ is the result from step 430 and N is the number of transactions 421 in the test period T.

In step 450, the average foreground (application) resource cost per transaction R(i) from step 442, the average background resource cost per transaction $R_0(i)$ from step 445 are summed to obtain the average application server resource cost per transaction $$R_{serv}(i) = R(i) + R0(i).$$

In step 451, a discrete event simulator model is built using $R_{serv}(i)$. The model simulates transactions at the same rate as they appear in the transaction log and simulates the consumption on average by each transaction of $R_{serv}(i)$ units of resource i, thereby simulating both the foreground and background resource costs. The discrete event simulator model is then submitted to discrete event simulator 322.

Figure 6:
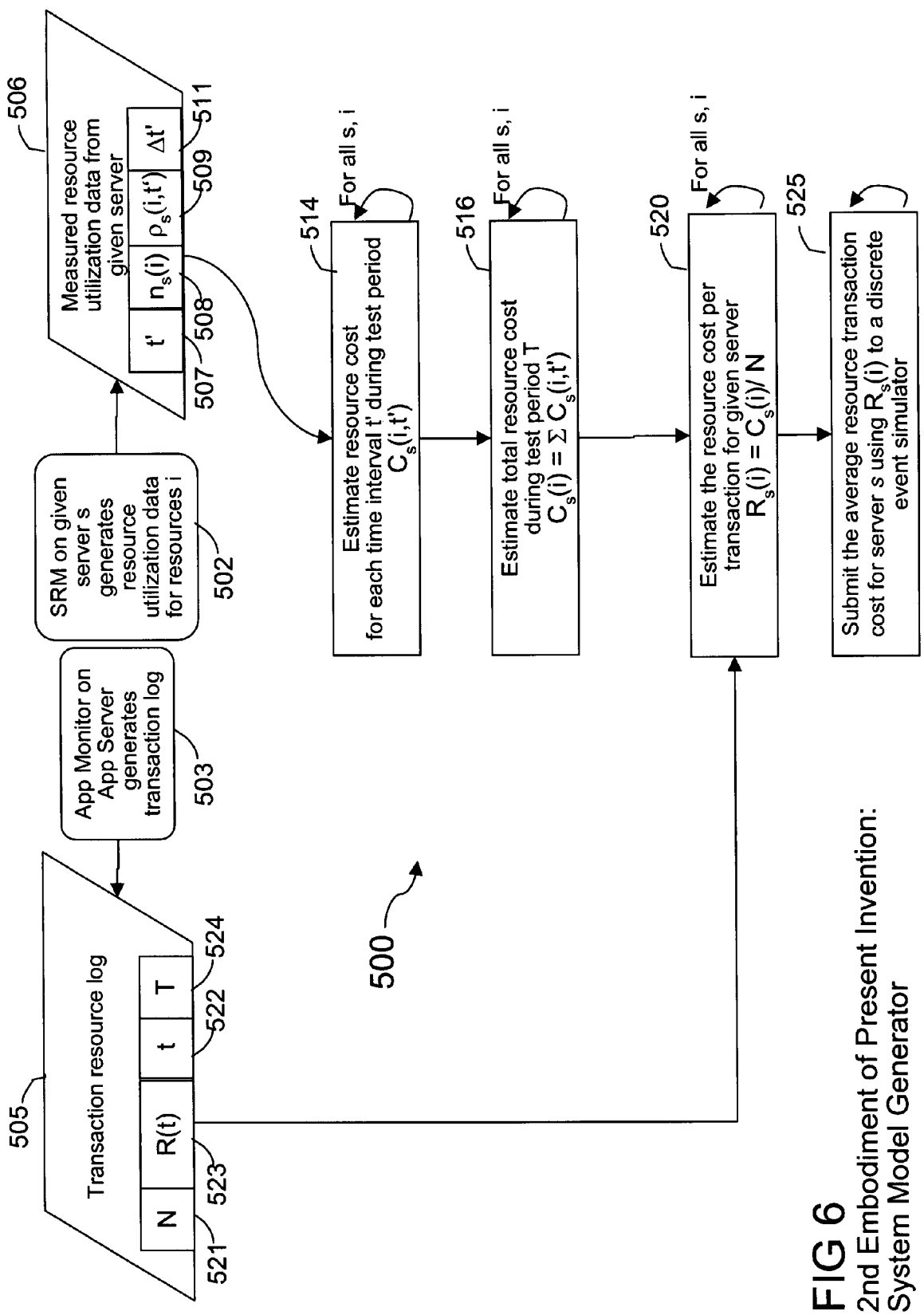
FIG. 6 is a flow chart describing the system model generator of the second embodiment of the present invention.

Another embodiment of the present invention, shown as process 500 in the flow chart of FIG. 6, the SRMs are measuring resource utilization on a set of servers other than a given application server in measurement step 502. Typically there is a plurality of SRMs running on the given set of servers, and there is a set of one or more applications running on the application server, the set of applications including a measured software application to be modeled. In addition to SRM(s), the measured software application generates transaction log 505 in transaction log generation step 503. Transaction log 505 will cover transactions across test period 524, labeled T. An example of the given set of servers is a webserver, a database server and application servers other than the application server on which the measured software application resides.

Resource utilization data 506 is similar to that shown in Table 2 and contains time stamps 507, labeled t', associated with periodic resource measurements, the measurements being made in periodic time intervals 511, labeled Δt'. Resource utilization 509 measured at time t' for the duration of interval Δt' is contained in resource utilization data 506 and designated by $\rho_s(i, t')$ where the index i refers to a specific server resource such as a CPU on a specific server s chosen from the set of servers. It is possible for some resource utilizations to be spread across multiple devices, for example CPU utilization in a server that has 2 CPUs. Resource utilization data 506 contains the number of unit resources 508 per server resource designated by $n_s(i)$.

In step 514 of process 500 resource cost is computed for each server s for all resources i. Resource cost is the amount of resources consumed in a time interval Δt' and is given by:

$$C_s(i,t') = \rho_s(i,t') \cdot \Delta t' \cdot n_s(i)$$

for all resources i and servers s. A relevant example of this step was given previously in the context of step 414 of process 400.

In step 516 of process 500 total server resource cost for each resource i is computed for the test period T by summing the resource cost for all the time intervals contained within the test period T for a server s. This step is repeated for all servers s and can be expressed as:

$$C_s(i) = C_s(i, T) = \sum_T C_s(i, t')$$

A relevant example of this step was given previously in the context of step 416 of process 400.

Turning back to the transaction data, transaction log 505 contains a record of all transactions occurring during test period T so that a certain number of transactions 521, labeled N, are logged during time T. Each transaction is comprised of a time stamp 522, labeled t, and a list of resource costs for each transaction 523, labeled $R_j(t)$, where j is a resource index assigned to each resource on the application server. The resource utilization times t' are contained within the time frame of the test period T.

After completion of step 516 and given the data in transaction log 505, an estimate for the average resource cost per transaction for a given server s is computed in averaging step 520 as: $R_s(i)=C_s(i)/N$ for all servers s. $R_s(i)$ is submitted in step 525 to discrete event simulator 322 to simulate the average transaction resource cost on the server s.

In an alternate embodiment of the present invention, the resource cost per transaction is calculated only for a subset of servers taken from the set of servers included in the resource utilization data 506.

In computing the average resource cost per transaction, it is assumed that the resource utilization data 506 on the servers other than the application server containing the measured software application is solely attributable to the transactions in the application server's transaction log 505 and likewise for the resulting simulated transaction resource cost in step 525. It is more likely that some of the resource utilization is attributable to system housekeeping (operating system overhead) or to other running applications. Another embodiment of the present invention addresses this situation.

Figure 7:
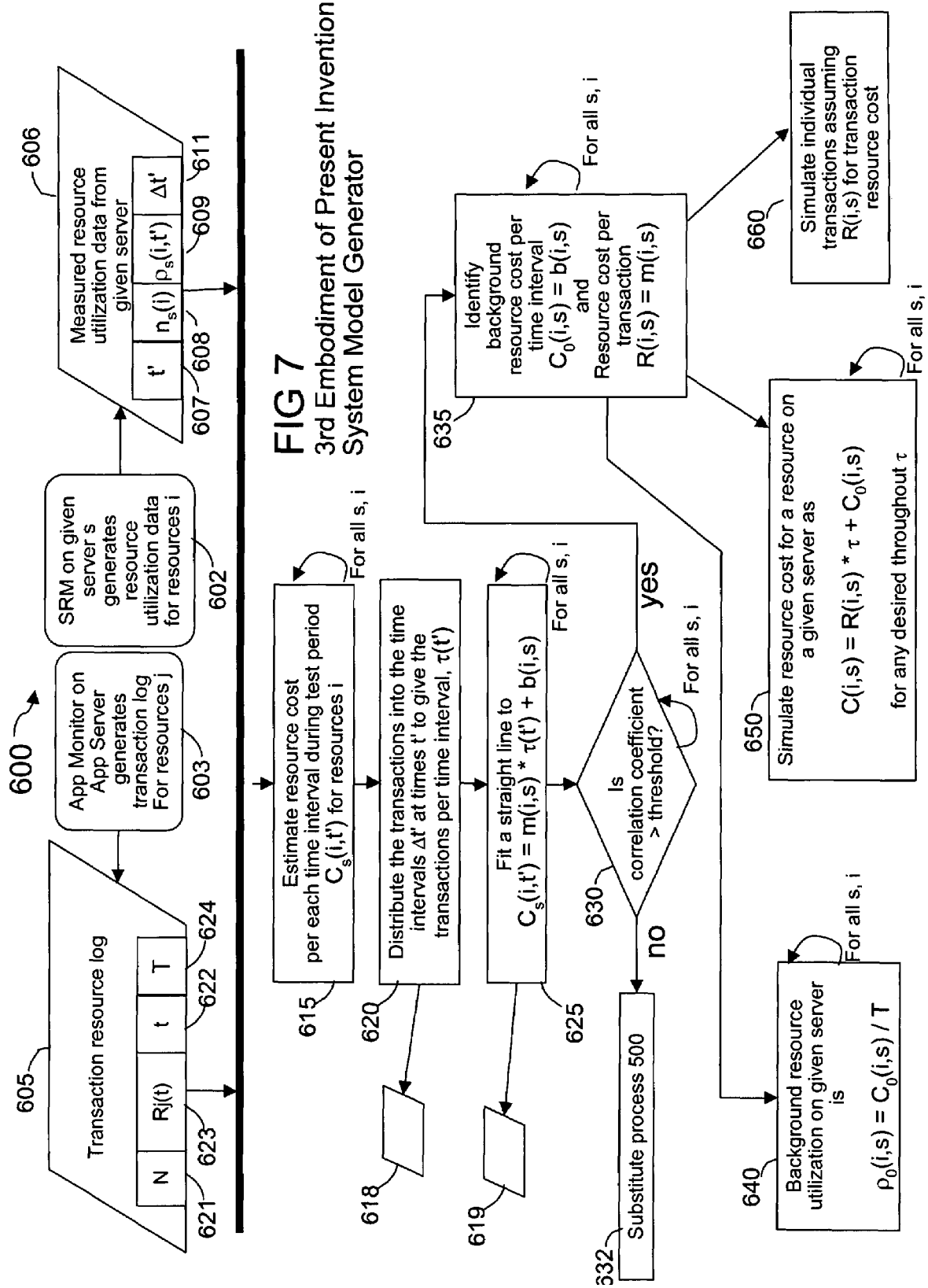
FIG. 7 is a flow chart describing the system model generator of the third embodiment of the present invention.

The next preferred embodiment of the present invention is shown in the flow chart of FIG. 7 as process 600. In measurement step 602, SRMs are measuring resource utilization on a set of servers other than a given application server. There is a plurality of SRMs running on the given set of servers, and there is a set of one or more applications running on the given application server, the set of applications including a measured software application to be modeled. In addition to SRM(s), the measured software application generates transaction log 605 in transaction log generation step 603. Transaction log 605 will include transactions occurring during test period labeled T, in step 624. An example of the given set of servers is a web-server, a database server and application servers other than the application server on which the measured software application resides.

Resource utilization data 606 is similar to that shown in Table 2 and contains time stamps 607, labeled t', associated with periodic resource measurements, the measurements being made in periodic time intervals 611, labeled $\Delta t'$. Resource utilization 609 measured at time t' for the duration of interval $\Delta t'$ is contained in resource utilization data 606 and designated by $\rho_s(i,t')$ where the index i refers to a specific server resource such as a CPU on a specific server s chosen from the given set of servers. It is possible for some resource utilizations to be spread across multiple devices, for example CPU utilization in a server that has 2 CPUs. Resource utilization data 606 contains the number of unit resources 608 per server resource designated by $n_s(i)$.

As for the transaction data, transaction log 605 contains a record of all transactions occurring during the test period T so that a certain number of transactions 621, labeled N, occur and are logged during time T. Each transaction is comprised of a time stamp 622, labeled t, and a list of resource costs for the transaction 623, labeled $R_j(t)$, where j is a resource index assigned to each resource on the application server. It is essential to the process that the resource utilization times t' are contained within the time frame of the test period T.

After the test period T, data will become available from the transaction log 605 and resource utilization data 606. Process 600 continues with estimate step 615 in which a resource cost estimate is computed for a given server's resources i. Resource cost is computed by:

$$C_s(i,t') = \rho_s(i,t') \cdot \Delta t' \cdot n_s(i)$$

for all resources i and servers s.

Distribute step 620 distributes the N transactions from transaction log 605 into $\tau(t')$ transactions in the time intervals $\Delta t'$ to create and store transaction throughput data 618 for each server. For example, consider the data from Table 2 where $\Delta t'=60$ seconds and assume that there were N=1000 transactions in the time period T=180 seconds as indicated in an application transaction log. The transaction log is further evaluated to find the number of transactions per each 60 second time interval and binned accordingly. The result of the distribution process is stored transaction throughput data 618 which contains data such as that shown in Table 3.

TABLE 3

Transaction throughput example

| Time [t'] | Transactions Per Minute [throughput $\tau(t')$] | CPU seconds [C(t')] |
|---|---|---|
| 13:20:00 | 81 | 9.18 |
| 13:21:00 | 535 | 27.12 |
| 13:22:00 | 384 | 21.18 |

In Table 3, the column "Time" are the times t', $\Delta t'$ is 1 minute, the column "Transactions Per Minute" are the throughputs $\tau(t')$, and "CPU seconds" is the resource cost C(CPU, t') for the CPU resource. The stored transaction throughput data 618 will contain for each server s, a table of i+2 columns: one for the time column, one for the throughput column and i columns for the resource cost of each resource.

To illustrate the novelty and benefits of the process 600 as described so far, consider that the average resource cost per transaction may be computed in a way similar to step 520 of process 500, but, with total N transactions in period T, replaced by $\tau(t')$, the number of transactions per time period $\Delta t'$. A table like Table 4 results:

TABLE 4

Cost per transaction vs. Transaction throughput

| Time [t] | Transaction per minute [throughput $\tau(t)$] | CPU seconds [C(t)] | CPU per Transaction |
|---|---|---|---|
| 13:20:00 | 81 | 9.18 | 0.113971 |
| 13:21:00 | 535 | 27.12 | 0.050696 |
| 13:22:00 | 384 | 21.18 | 0.055085 |

Note that the "CPU per Transaction" (resource cost per transaction) declines as "Transaction Throughput" increases. System managers familiar with the art of systems performance would see the data of Table 4 and realize that background load unrelated to the measured software application is inflating the resource cost per transaction for low transaction throughputs. Observing such a declining trend is in fact a means of determining that the resource usage related to the application must be separated from resource usage unrelated to the application if a more accurate system model is desired. The process 600 is contemplated as a means of separating the two types of resource usage and providing a more accurate system model than given in process 400 and process 500 where only bulk averages were obtained.

Process 600 continues in regression step 625 where a straight line is fit to resource costs as a function of calculated throughput contained in throughput data 618. Linear regressions are performed for all resources i in each server s according to:

$$C_s(i,t')=m(i,s)\cdot\tau(t')+b(i,s)$$

where m(i, s) are the computed slopes from the linear regression analysis and b(i, s) are the computed intercepts from the linear regression analysis. The regression is performed for all servers s and their resources i. A correlation coefficient $r^2$ (i, s) is calculated for each regression. m(i, s), b(i, s) and $r^2$ (i, s) are stored in a repository 619 such as computer memory or in a disk file for further use.

In step 630, the correlation coefficients $r^2$(i,s) are checked against a threshold and if greater than or equal to the given threshold, the linear regression is considered acceptable and process 600 continues with step 635. For any of the servers s and resources i in which $r^2$(i,s) is less than the given threshold, process 500 is substituted in substituting step 632, to generate the modeled transaction resource costs. In the preferred embodiment of the present invention, the default threshold for $r^2$ is 0.80 and the threshold may be adjusted by a user.

In step 635, the slope m(i,s) is identified as the resource cost per transaction R(i,s) for resource i on server s. The intercept b(i,s) is identified as the background resource cost $C_0$(i,s) for resource i and server s that is unrelated to the measured software application.

The data so obtained is useful for simulation and modeling. First, in step 640, a background resource utilization can be calculated as $\rho_0(i,s)=C_0(i,s)/T$. The result may be submitted to the discrete event simulator 322 to simulate a random process for the background load of each server s.

Second, in step 650, the linear relationship so obtained by the regression analysis may be used to compute a given resource cost for resource i on a given server s with transaction throughput τ according to:

$$C(i,s)=R(i,s)*\tau+C_0(i,s)$$

The result may be submitted to the discrete event simulator 322 to simulate a random process for the background load of each server s.

Third, in step 660, individual transactions may be simulated in discrete event simulator 322 by simply assuming that each transaction will consume R(i, s)=m(i, s) of resource i on server s. The result may be submitted to the discrete event simulator 322 to simulate a random process for the background load of each server s.

Steps 625 through 660 are further explained by example. A linear regression is performed on the data of Table 3, where "transactions per minute" are the independent variable (x) and "CPU seconds" are the dependent variable (y). The regression fits a line y=mx+b, the result being that slope m=0.03948 "CPU seconds"/transaction and intercept b=6.0 CPU seconds per unit time interval, the unit time interval being equal to Δt' which is 1 minute in this example. The result may be submitted to the discrete event simulator 322 to simulate a random process for the background load of each server s.

Summarizing the example: first, each transaction is modeled to consume on average R=0.03948 "CPU seconds" and, second, the model has an overall background CPU utilization of $$\rho=6.0 \text{ 'CPU seconds'}/60 \text{ seconds}=10\% \text{ CPU}.$$

Both results are useful for building a discrete event simulation.

If one is interested in modeling the resource consumption on a given server for a varying application load, then resource consumption is C=0.03948*τ+6.0, where τ is an assumed throughput for transactions related to the measured software application. Transaction throughput is a rate calculated as transactions per minute. Similarly, resource consumption C is calculated to be the amount of resources used per minute.

The data in Tables 3 and 4 were generated from the resource utilization data in Table 2, which characterizes, for example, resource consumption on a given web-server. If the system manager would like to understand CPU utilization on the given web-server in the scenario that transaction throughput (load) doubles from the current state then the peak throughput would be double the transactions per minute of the largest value in Table 4, namely 1070 transactions per minute. The web-server is predicted to exhibit a peak CPU resource utilization of C=0.03948(1070)+6=42.25 CPU seconds/minute=70% of CPU capacity.

In the next preferred embodiment of the present invention, process 600 can be extended to the application server by fitting a straight line is to the background resource consumption of the application server as a function of transaction throughput. The resulting process 700 is shown in the flow chart of FIG. 8, which describes a system modeling process 700 wherein a set of one or more SRM(s) exist on a given application server only. In measurement step 702, SRM(s) generate measured resource utilization data 706 for the given application server only. Typically there is one SRM in this situation, but there may be multiple, even unknown, applications running on the same application server. In addition to SRM(s), the software application to be modeled generates transaction log 705 in transaction log generation step 703. Transaction log 705 will describe transactions occurring in a given test period labeled as T in step 724.

Resource utilization data 706 contains time stamps 707, labeled as t', associated with periodic resource measurements, the measurements being made in time intervals 711, labeled as Δt'. Measured resource utilization 709 is also contained in resource utilization data 706 and is designated by ρ(i, t') where the index i refers to a specific system resource, such as a CPU on a specific server. It is possible for some resource utilizations to be spread across multiple devices, for example in a server that has 2 CPUs. Resource utilization data 706 contains the number of unit resources 708 designated by n(i).

In step 714 of process 700 resource cost is computed for all system resources i. Resource cost is the amount of resources consumed in a time interval and is given by:

$$C(i,t')=\rho(i,t')\cdot\Delta t'\cdot n(i)$$

According to the transaction resource information, transaction log 705 contains a record of all transactions occurring during the test period T so that a certain number of transactions 721, labeled as N, are logged during time T. Each transaction is comprised of time stamp 722, labeled t, and a list of resource costs for the transaction 723, labeled Rj(t), where j is an index describing the system resource used. Note that the transaction times t are not periodic like the resource utilization measurement times t' and in general the two time series are not in synchronization with another. A subset of resource utilization times t' are contained within the test period T.

The next step in the process 700 related to transaction processing is step 725 to calculate the total application resource cost which is the total resource usage by the application during the test period T. Total application resource cost $C_{app}$ is computed as:

$$C_{app}(j, T) = \sum_T R_j(t)$$

The process 700 continues with step 730, wherein the data from steps 714 and 725 are combined to estimate the average background resource consumption, $C_0(i,t')$ during time intervals Dt' at times t' are not related to the given software application or not measured by the given software application. The calculation proceeds as follows:

$$C_0(i, t') = C(i, t') - C_{app}(i, T) * \frac{\Delta t'}{T}$$

where a specific resource j in the transaction log is identified in the present step 430 as a specific system resource i in the resource utilization data.

Distribute step 735 distributes the N transactions from transaction log 705 into Δ(t') transactions in the time intervals Δt' to create and store transaction throughput data 738 for each server.

Process 700 continues in regression step 740 where a straight line is fit to background resource costs $C_0(i,t')$ as a function of calculated throughput Δ(t') contained in throughput data 738. Linear regressions are performed for all resources i in the application server according to:

$$C_0(i,t') = m_0(i) \cdot \tau(t') + b_0(i)$$

where $m_0(i)$ are the computed slopes from the linear regression analysis and $b_0(i)$ are the computed intercepts from the linear regression analysis. The regression is performed for all resources i. A correlation coefficient $r_0^2(i)$ is calculated for each regression. $m_0(i)$, $b_0(i)$ and $r_0 2 (i)$ are stored in a repository 739 such as computer memory or in a disk file for further use.

In step 745, the correlation coefficients $r_0^2(i)$ are checked against a threshold for all resources i and if greater than or equal to the given threshold, the linear regression is considered acceptable and process 700 continues with step 755. For resources i in which $r_0^2(i)$ is less than the given threshold, process 400 is substituted in substituting step 750, to generate the modeled transaction resource costs. In the preferred embodiment of the present invention, the default threshold for $r_0^2(i)$ is 0.80 and the threshold may be adjusted by a user.

In step 755, the slope $m_0(i)$ is identified as the background resource cost per transaction $R_0(i)$ for all resources i: $R_0(i) = m_0(i)$.

In step 760, an average foreground resource cost per transaction is calculated according to:

$$R(i) = C_{app}(i,T)/N$$

for all resources i.

In step 770, the two costs, R(i) and $R_0(i)$ are summed for all resources i to obtain the average application server resource cost per transaction as:

$$R_{sys}(i) = R(i) + R_0(i).$$

In step 775, a discrete event simulator model is built using $R_{sys}(i)$. The model simulates transactions at the same rate as they appear in the transaction log and simulates the consumption on average by each transaction of "$R_{sys}(i)$" units of resource i, thereby simulating both the foreground and background resource costs for the application server.

The invention claimed is:

1. A system for creating a set of predicted resource utilizations of a computer application wherein the computer application operates as a software program on a system of servers configured to operate a set of software programs; the set of resources containing a set of local resources and a set of remote services; wherein the set of local resources is connected to the set of application servers; wherein the set of remote resources is connected to the set of networked servers; the system of servers include a set of application servers which are connected to a set of networked servers by a communications network, and wherein the computer application utilizes a set of system resources the set of system resources contain a set of local resources and a set of remote resources; wherein the set of local resources is connected to the set of application servers; wherein the set of remote resources is connected to the set of networked servers; the set of local resources containing a local CPU resource for executing software programs, a local RAM resource for storing software programs and for storing dynamic data, a local data storage resource for storing persistent data, and a local data pipe resource for communicating with the set of software programs by a set of transactions; the set of remote resources containing a remote CPU resource for executing software programs, a remote RAM resource for storing software programs and for storing dynamic data, a remote data storage resource for storing persistent data, and a remote data pipe resource for communicating with at least one networked server in the set of networked servers and at least one application server in the set of application servers; each of the set of transactions including an exchange of data associated with the computer application; wherein at least one of the set of networked servers services at least one transaction of the set of transactions and services a set of requests from at least one network server in the set of networked servers; the set of transactions causing usage of the set of system resources; wherein a transaction log associated with the computer application is generated and contains a list of transaction information measured by the computer application; the list of transaction information describing resource usage by the computer application; wherein a set of system resource monitors resides on the system of servers, and each system resource monitor is associated with a particular server in the system of servers, each system resource monitor operating on at least one software program in the set of software programs; wherein at least one system resource monitor of the set of system resource monitors measures a set of resource utilization data for the particular server of the set of servers with which the system resource monitor is associated, the system comprising:

a. a performance criteria describing an expected resource utilization by the computer application;

b. a system resource utilization data repository for storing and organizing the set of resource utilization data, the system resource utilization data repository residing on and operating on at least one server in the system of servers;

c. a system model generator residing on and operating on at least one server in the system of servers, the system model generator creating a set of predicted resource utilizations for the system of servers, derived from the set of resource utilization data and from the transaction log; and wherein the set of system resource utilization data contains a set of measured resource utilizations, ρ(i, t'), measured at a set of times t' over a time interval Δt' for the system resources i in the set of local resources and wherein any given local resource in the set of local resources is comprised of a plurality of n(i) entities;

wherein the transaction loci contains a set of measured resource costs $R_j(t)$ corresponding to a group of transactions of the set of transactions occurring at a plurality of times t and for the system resources j in the set of local resources, the system model generator comprising a computer software program residing on at least one server in the set of servers and programmed to:

a. compute a resource cost, $C(i, t')$, for each system resources i in the set of system resources according to the formula, $$C(i,t') = \rho(i,t') \cdot \Delta t' \cdot n_i;$$

b. compute a total system resource cost, $C_{sys}(i, T)$, for each system resource i in the set of local resources, for a test period T, by summing the resource cost for the test period T according to the formula, $$C_{sys}(i, T) = \sum_{t' \in T} C_i(t');$$

c. compute the total application resource cost, $C_{app}(i, T)$, during the test period T, according to $$C_{app}(j, T) = \sum_{t \in T} R_j(t),$$

where the sum is taken over all resource costs $R_j(t)$ occurring within the test period T;

d. calculate an average background resource consumption, $C_0(i, T)$, for each system resource i of the set of local resources, consumed during test period T, according to the formula, $$C_0(i,T) = C_{sys}(i,T) - C_{app}(j,T),$$

where a particular system resource listed in the transaction log indexed as j is associated with a particular system resource from the set of system resources in the set of resource utilization data indexed as i, and, e. calculate a set of constant background load values, $\rho_0(i)$, for each system resource i of the set of system resources measured during the test period T, according to the formula, $$\rho_0(i) = C_0(i,T)/T.$$

2. The system of claim 1 wherein the system model generator is further programmed to submit the set of constant background load values to a discrete event simulator.

3. The system of claim 1 wherein the set of system resource utilization data contains a set of measured resource utilizations, $\rho(i, t')$, measured at a set of times t' over a time interval $\Delta t'$ for the system resources i in the set of local resources and wherein any given local resource in the set of local resources is comprised of a plurality of n(i) entities;

wherein the transaction log contains a set of measured resource costs $R_j(t)$ corresponding to a group of transactions of the set of transactions occurring at a plurality of times t and for the system resources j in the set of local resources, the system model generator comprising a computer software program residing on at least one server in the set of servers and programmed to:

a. compute a resource cost $C(i, t')$ for each system resources i in the set of systems resources according to the formula $$C(i,t') = \rho(i,t') \cdot \Delta t' \cdot n(i)$$

b. compute total system resource cost $C_{sys}(i, T)$ for each system resource i in the set of local resources, for a given test period T, by summing the resource cost for the test period T according to the formula, $$C_{sys}(i, T) = \sum_{t' \in T} C(i, t');$$

c. compute the total resource cost $C_{app}(j, T)$, during the test period T using the formula, $$C_{app}(j, T) = \sum_{t \in T} R_j(t),$$

where $R_j(t)$ is the resource cost for a given transaction from the set of transactions occurring at time t and the sum is taken over all resource costs $R_j(t)$ occurring within the test period T d. calculate an average background resource consumption $C_0(i, T)$, for each system resource i of the set of system resources consumed during the test period T, according to the formula, $$C_0(i,T) = C_{sys}(i,T) - C_{app}(j,T)$$

where a particular system resource listed in the transaction log indexed as j is associated with a particular system resource from the set of system resources in the set of resource utilization data indexed as i.

e. calculate an average foreground resource cost per transaction, using the transaction log and the formula, $$R(i) = C_{app}(i,T)/N,$$

for each of the associated system resources i from the set of system resources, where N is the number of transactions that occurred in the test period T;

f. calculate an average background resource cost per transaction, using the transaction log and the formula, $$R_0(i) = C_0(i,T)/N,$$

for each of the system resources i from the set of system resources, and where N is the number of transactions that occurred in the test period T; and, g. use the average foreground resource cost per transaction, $R(i)$, and the average background resource cost per transaction, $R_0(i)$, to obtain an average server resource cost per transaction according to the formula, $$R_{serv}(i) = R(i) + R_0(i).$$

4. The system of claim 1 wherein the set of system resource utilization data contains a set of measured resource utilizations, $\rho_s(i, t')$, measured at a set of times t' over a time interval $\Delta t'$ for system resources i of the set of remote resources and wherein any given remote resource is comprised of a plurality of $n_s(i)$ entities;

wherein the transaction log contains a set of measured resource costs $R_j(t)$ corresponding to a group of transactions of the set of transactions occurring at a plurality of times t and for a group of system resources j contained in the set of remote resources, the system model generator comprising a computer software program residing on at least one server in the set of servers and programmed to:

a. compute the resource cost $C_s(i, t')$ for each server s in the set of networked servers, for all system resources i associated with the set of networked servers, using the system resource utilization data and the formula, $$C_s(i,t')=\rho_s(i,t')\cdot \Delta t' \cdot n_s(i);$$

b. compute total server resource cost $C_s(i, T)$ for all system resource i in the set of system resources on each server s in the set of networked servers for a given test period T by summing the resource costs occurring within the test period T according to the formula, $$C_s(i, T) = \sum_{t' \in T} C_s(i, t');$$

for all servers in the system of servers; and, c. calculate an average resource cost per transaction for each of the application servers in the set of networked servers, using the transaction log and the formula, $$R_s(i)=C_s(i,T)/N,$$

for all system resources i of the set of system resources and servers s of the system of servers, where N is the number of transactions that occurred in the test period T.

5. The system of claim 4 wherein the system model generator is programmed to submit the average transaction resource cost as $R_s(i)$ to the discrete event simulator.

6. The system of claim 1 wherein the set of system resources contains a set of measured resource utilizations, $\rho_s(i, t')$, measured at a set of times t' over a time interval $\Delta t'$ for system resources i of the set of remote resources and wherein a given remote resource is comprised of a plurality of $n_s(i)$ entities;

wherein the transaction log contains a set of measured resource costs $R_j(t)$ corresponding to a group of transactions occurring at a plurality of times t from the set of transactions; and for a group of system resources j contained in the set of remote resources, a system model generator comprising a computer software program residing on at least one server in the set of servers and programmed to:

a. compute the resource cost Cs (i, t') for each server s in the set of networked servers, for all system resources i associated with the set of networked servers, using the system resource utilization data and the formula, $$C_s(i,t')=\rho_s(i,t')\cdot \Delta t' \cdot n_s(i);$$

b. distribute the set of transactions from the transaction log into a set of $\tau(t')$ transactions occurring in the time intervals $\Delta t'$, c. perform a linear regression to fit a straight line function to the resource costs $C_s(i,t')$ for each server s as a function of $\tau(t')$, for each system resource i of the set of system resources according to the formula, $$C_s(i,t')=m(i,s)\cdot \tau(t')+b(i,s);$$

where the m(i, s) is the computed slope from the linear regression analysis and b(i, s) is the computed intercept from the linear regression analysis and where a set of correlation coefficients $r^2(i, s)$ are generated for each linear regression, d. compare the set of correlation coefficients $r^2(i,s)$ to a predetermined threshold; and, e. calculate a resource cost for the given resource i and server s.

7. The system of claim 6 wherein the system model generator is additionally programmed to calculate resource costs according to the formula, $C(i,s)=R(i,s)*\tau+C_0(i,s)$, for each system resource i of the set of system resources and each server s of the system of servers, for a set of transaction throughput values, $\tau$, and wherein R(I,s)=M(I,s) and $C_O(i,s)=b(i,s)$.

8. The system of claim 6 wherein the system model generator is additionally programmed to calculate background resource utilization according to $\rho_0(i,s)=C_0(i,s)/T$, for test period T, for all resources i and for all servers s and where $C_O(i,s)=b(i,s)$.

9. The system of claim 6 wherein the system model generator is additionally programmed to simulate transaction resource cost as R(i, s) for each system resource i of the set of system resources and each server s of the system of servers, and where R(i,s)=M(i,s).

10. The system of claim 6 wherein the system model generator is further programmed to submit the resource cost to a discrete event simulator.

11. The system of claim 1 wherein the set of system resource utilization data contains a set of measured resource utilizations, $\rho(i, t')$, measured at a set of times t' over a time interval $\Delta t'$ for the system resources i in the set of local resources and wherein any given local resource in the set of local resources is comprised of a plurality of n(i) entities;

wherein the transaction log contains a set of measured resource costs $R_j(t)$ corresponding to a group of transactions of the set of transactions occurring at a plurality of times t and for the system resources j in the set of local resources, the system model generator comprising a computer software program residing on at least one server in the set of servers and programmed to:

a. compute a resource cost, C(i,t'), for each system resources i in the set of systems resources according to the formula $$C_{sys}(i,t')=\rho(i,t')\cdot \Delta t' \cdot n(i)$$

b. compute the total application resource cost, Capp (j, T), during the test period T using the formula, $$C_{app}(j, T) = \sum_{t \in T} R_j(t),$$

where $R_j(t)$ is the resource cost for a given transaction from the set of transactions occurring at time t and the sum is taken over all resource costs $R_j(t)$ occurring within the test period T;

c. Calculate the average background resource consumption, $C_0(i, T)$, for each system resource i of the set of system resources consumed during time intervals $\Delta t'$, according to the formula, $$C_0(i, t') = C(i, t') - C_{app}(i, T) * \frac{\Delta t'}{T}$$

where a particular system resource listed in the transaction log indexed as j is associated with a particular system resource from the set of system resources in the set of resource utilization data indexed as i.

d. distribute the set of transactions from the transaction log into a set of τ(t') transactions occurring in the time intervals Δt', e. perform a linear regression to fit a straight line fit for the average background resource consumption $C_0(i, t')$ as a function of τ(t'), for each system resource i of the set of system resources according to the formula, $$C_0(i,t')=m_0(i)\cdot\tau(t')+b_0(i);$$

where the $m_0(i)$ is the computed slope from the linear regression analysis and $b_0(i)$ is the computed intercept from the linear regression analysis and where a set of correlation coefficients $r^2(i, s)$ are generated for each linear regression, f. compare the set of correlation coefficients $r^2(i,s)$ to a predetermined threshold;

g. equate a background resource cost per transaction as $R_0(i)=m_0(i)$;

h. calculate an average foreground resource cost per transaction, R(i), using the transaction log and the formula, $$R(i)=C_{app}(i,T)/N,$$

for each of the associated system resources i from the set of system resources, where N is the number of transactions that occurred in the test period T.

i. subtract, for each system resource i of the set of system resources, the average background resource cost per transaction, $R_0(i)$, from the average foreground resource cost per transaction, R(i), to obtain an average server resource cost per transaction according to the formula, $$R_{serv}(i)=R(i)+R_0(i); \text{ and,}$$

j. submit the average server resource cost per transaction, $R_{serv}(i)$, to a discrete event simulator.

12. A method for improving the performance of a computer application wherein the computer application operates as a software program on a first configuration of a system of servers operating on a set of software programs; the system of servers including a set of application servers which are connected to a set of networked servers by a communications network, and wherein the computer application utilizes a set of system resources; the set of system resources including a set of local resources and a set of remote resources; the set of local resources connected to the set of application servers, and wherein the computer application utilizes a set of remote resources connected to the set of networked servers; the set of local resources containing a local CPU resource for executing software programs, a local RAM resource for storing software programs and for storing dynamic data, a local data storage resource for storing persistent data, and a local data pipe resource for communicating with the set of software programs by a set of transactions; each of the set of transactions including an exchange of data associated with the computer application; wherein at least one of the set of networked servers services at least one transaction of the set of transactions and services a set of requests from at least one network server of the set of networked servers; the set of transactions causing the usage of the set of system resources and the set of remote resources; wherein the set of remote resources contains a remote CPU resource for executing software programs, a remote RAM resource for storing software programs and for storing dynamic data, a remote data storage resource for storing persistent data, and a remote data pipe resource for communicating with at least one networked server in the set of networked servers and at least one application server in the set of application servers; and wherein a transaction log associated with the computer application is generated and contains a list of transaction information measured by the computer application; the list of transaction information describing resource usage by the computer application; wherein a set of system resource monitors resides on the system of servers, each system resource monitor is associated with a particular server in the system of servers, each system resource monitor operating on at least one software program in the set of software programs; and wherein at least one system resource monitor of the set of system resource monitors measures a set of resource utilization data for the particular server of the set of servers with which the system resource monitor is associated, the method comprising:

a. causing the computer application to run under a set of load conditions;

b. collecting a transaction log from the computer application;

c. collecting the set of resource utilization data and storing the resource utilization data in a system resource utilization repository;

d. generating a system model by combining the list of transaction information with the resource utilization data;

e. running a discrete event simulation based on the system model to create a predicted system resource usage by the computer application;

f. comparing the predicted system resource usage to a desired performance criteria for system resource usage;

g. changing the system of servers to a second configuration which meets the desired performance criteria for system resource usage; and, wherein the set of system resource utilization data contains a set of measured resource utilizations, ρ(i, t'), measured at a set of times t' over a time interval Δt' for the system resources i in the set of local resources and wherein any given local resource in the set of local resources is comprised of a plurality of n(i) entities;

wherein the transaction log contains a set of measured resource costs, R(i, t), corresponding to a group of transactions of the set of transactions occurring at a plurality of times t and for the system resources i in the set of local resources, the step of generating a system model further comprising:

a. computing from the set of system resource utilization data, a resource cost, C(i, t'), for each system resources i in the set of system resources according to the formula, $$C(i,t')=\rho(i,t')\cdot\Delta t'\cdot n_i;$$

b. computing a total system resource cost, $C_{sys}(i, T)$, for each system resource i in the set of local resources, for a test period T, by summing the resource cost for the test period T according to the formula, $$C_{sys}(i, T) = \sum_{t' \in T} C_i(t');$$

c. computing from the transaction log the total application resource cost, $C_{app}(i, T)$, during the test period T using the formula, $$C_{app}(j, T) = \sum_{t \in T} R_j(t)$$

the sum is taken over all resource costs $R_j(t)$ occurring within the test period T;

d. estimating an average background resource consumption, $C_0(i, T)$, for each system resource i of the set of local resources, consumed during test period T, according to the formula, $$C_0(i,T) = C_{sys}(i,T) - C_{app}(j,T),$$

where a first particular system resource listed in the transaction log indexed as j is associated with a second particular system resource in the set of resource utilization data indexed as i.

e. assuming a constant background utilization for the set of application servers; and, f. calculating a set of constant background load values, $\rho_0(i)$, for each system resource i of the set of system resources measured during the test period T, according to the formula, $$\rho_0(i) = C_0(i,T)/T.$$

13. The method of claim 12 further comprising submitting the background load for each system resource i of the set of system resources, during a simulated transaction, as a random process using as a mean the set of constant background load values $\rho_0(i)$ to a discrete event simulator.

14. The method of claim 12 wherein the set of system resource utilization data is comprised of a set of measured resource utilizations, $\rho(i, t')$, measured at a set of times t' over a time interval $\Delta t'$ for the system resources i in the set of local resources and wherein any given local resource in the set of local resources is comprised of a plurality of n(i) entities;

wherein the transaction log contains a set of measured resource costs $R_j(t)$ corresponding to a group of transactions of the set of transactions occurring at a plurality of times t and for the system resources j in the set of local resources, the step of generating a system model further comprising:

a. computing from the set of system resource utilization data, a resource cost, $C(i,t')$, for each system resources i in the set of systems resources according to the formula, $$C(i,t') = \rho(i,t') \cdot \Delta t' \cdot n(i)$$

b. computing a total system resource cost, $C_{sys}(i, T)$, for each system resource i in the set of local resources, for a given test period T, by summing the resource cost for the test period T according to the formula, $$C_{sys}(i, T) = \sum_{t' \in T} C(i, t');$$

c. computing from the transaction log the total application resource cost, $C_{app}(j, T)$, during the test period T using the formula, $$C_{app}(j, T) = \sum_{t \in T} R_j(t),$$

where $R_j(t)$ is the resource cost for a given transaction from the set of transactions occurring at time t and the sum is taken over all resource costs $R_j(t)$ occurring within the test period T;

d. estimating an average background resource consumption, $C_0(i, T)$, for each system resource i of the set of system resources consumed during test period T, according to the formula, $$C_0(i,T) = C_{sys}(i,T) - C_{app}(j,T)$$

where a particular system resource listed in the transaction log indexed as j is associated with a particular system resource in the set of resource utilization data indexed as i.

e. estimating an average foreground resource cost per transaction, using the transaction log and the formula, $$R(i) = C_{app}(i,T)/N,$$

for each of the associated system resources i from the set of system resources, where N is the number of transactions that occurred in the test period T.

f. estimating an average background resource cost per transaction, using the transaction log and the formula, $$R_0(i) = C_0(i,T)/N;$$

for each of the system resources i from the set of system resources, and where N is the number of transactions that occurred in the test period T; and, g. summing, for each system resource i, of the set of system resources, the average foreground resource cost per transaction, R(i), with the average background resource cost per transaction, $R_0(i)$, to obtain an average server resource cost per transaction, $R_{serv}(i)$, according to the formula, $$R_{serv}(i) = R(i) + R_0(i).$$

15. The method of claim 12 wherein the set of system resource utilization data contains a set of measured resource utilizations, $\rho_s(i, t')$, measured at a set of times t' over a time interval $\Delta t'$ for system resources i of the set of remote resources and wherein any given remote resource is comprised of a plurality of $n_s(i)$ entities;

wherein the transaction log contains a set of measured resource costs, $R_j(t)$, corresponding to a group of transactions of the set of transactions occurring at a plurality of times t and for a group of system resources j contained in the set of remote resources, the step of generating a system model further comprising:

a. computing the resource cost $C_s(i, t')$ for each server s in the set of networked servers, for all system resources i associated with the set of networked servers, using the system resource utilization data and the formula, $$C_s(i,t') = \rho_s(i,t') \cdot \Delta t' \cdot n_s(i);$$

b. computing total server resource cost $C_s(i, T)$ for all system resource i in the set of system resources on each server s in the set of networked servers for a given test period T by summing the resource costs occurring within the test period T according to the formula, $$C_s(i, T) = \sum_{t' \in T} C_s(i, t');$$

for all servers in the system of servers;
    c. estimating an average resource cost per transaction for each of the application servers in the set of networked servers, using the transaction log and the formula, $$R_s(i)=C_s(i,T)/N,$$

for all system resources i of the set of system resources and servers s of the system of servers, where N is the number of transactions that occurred in the test period T; and,
    d. using $R_s(i)$ to build a discrete event simulation model that simulates a total transaction resource cost for each of the servers in the set of networked servers.

16. The method of claim 12 wherein the set of system resource utilization data contains a set of measured resource utilizations, $\rho_s(i, t')$, measured at a set of times t' over a time interval $\Delta t'$ for system resources i of the set of remote resources and wherein a given remote resource is comprised of a plurality of $n_s(i)$ entities; wherein the transaction log contains a set of measured resource costs $R_j(t)$ corresponding to a group of transactions occurring at a plurality of times t from the set of transactions; and for a group of system resources j contained in the set of remote resources, the step of generating a system model further comprising:
    a. computing the resource cost Cs (i, t') for each server s in the set of networked servers, for all system resources i associated with the set of networked servers, using the system resource utilization data and the formula, $$C_s(i,t')=\rho_s(i,t')\cdot \Delta t' \cdot n_s(i);$$

b. distributing the set of transactions from the transaction log into a set of $\tau(t')$ transactions occurring in the time intervals $\Delta t'$,
    c. determining a straight line curve fit for the resource costs $C_s(i,t')$ for each server s as a function of $\tau(t')$, and performing a linear regression analysis for each system resource i of the set of system resources according to the formula, $$C_s(i,t')=m(i,s)\cdot \tau(t')+b(i,s);$$

where the m(i, s) is the computed slope from the linear regression analysis and b(i, s) is the computed intercept from the linear regression analysis and where a set of correlation coefficients $r^2(i, s)$ are generated for each linear regression,
    d. comparing the set of correlation coefficients $r^2(i,s)$ to a predetermined threshold;
    e. if a given correlation coefficient $r^2(i,s)$ of the set of correlation coefficients for a given resource i and server s is greater than or equal to the predetermined threshold, then using the straight line curve fit to estimate a resource cost for the given resource i and server s;
    f. identifying a background resource cost per time interval $\Delta t'$ as $C_0(i,s)=b(i,s)$; and,
    g. identifying a resource cost per transaction as R(i,s)=m(i,s).

17. The method of claim 16 including the additional step of simulating the resource cost on each of the servers in the set of networked servers as a function of a transaction throughput, $\tau$, which includes the calculation of resource costs according to the formula, $C(i,s)=R(i,s)*\tau+C_0(i,s)$, for each system resource i of the set of system resources and each server s of the system of servers.

18. The method of claim 16 including the additional step of simulating the background resource utilization on the servers in the set of networked servers which includes the calculation of background resource utilization, $\rho(i,s)$, according to the formula, $$\rho_0(i,s)=C_0(i,s)/T,$$

for test period T, for all resources i and for all servers s.

19. The method of claim 16 including the additional step of simulating the resource consumption on each of the servers in the set of networked servers by assuming that each transaction will consume R(i, s) of resource i on server s.

20. The method of claim 12 wherein the set of system resource utilization data is comprised of a set of measured resource utilizations, $\rho(i, t')$, measured at a set of times t' over a time interval $\Delta t'$ for the system resources i in the set of local resources and wherein any given local resource in the set of local resources is comprised of a plurality of n(i) entities;
    wherein the transaction log contains a set of measured resource costs, $R_j(t)$, corresponding to a group of transactions of the set of transactions occurring at a plurality of times t and for the system resources j in the set of local resources, the step of generating a system model further comprising:
    a. computing from the set of system resource utilization data, a resource cost, C(i,t'), for each system resources i in the set of systems resources according to the formula $$C_{sys}(i,t')=\rho(i,t')\cdot \Delta t' \cdot n(i)$$

b. computing from the transaction log the total application resource cost, $C_{app}(j, T)$, during the test period T using the formula, $$C_{app}(j, T) = \sum_{t \in T} R_j(t),$$

where $R_j(t)$ is the resource cost for a given transaction from the set of transactions occurring at time t and the sum is taken over all resource costs $R_j(t)$ occurring within the test period T;
    c. estimating an average background resource consumption, $C_0(i, T)$, for each system resource i of the set of system resources consumed during time intervals $\Delta t'$, according to the formula, $$C_0(i, t') = C(i, t') - C_{app}(i, T) * \frac{\Delta t'}{T}$$

where a particular system resource listed in the transaction log indexed as j is associated with a particular system resource from the set of system resources in the set of resource utilization data indexed as i.
    d. distributing the set of transactions from the transaction log into a set of $\tau(t')$ transactions occurring in the time intervals $\Delta t'$,
    e. determining a straight line fit for the average background resource consumption $C_0(i,t')$ as a function of $\tau(t')$, and performing a linear regression analysis for each system resource i of the set of system resources according to the formula, $$C_0(i,t')=m_0(i)\cdot \tau(t')+b_0(i);$$

where the $m_0(i)$ is the computed slope from the linear regression analysis and $b_0(i)$ is the computed intercept from the linear regression analysis and where a set of correlation coefficients $r^2(i, s)$ are generated for each linear regression, f. comparing the set of correlation coefficients $r^2(i,s)$ to a predetermined threshold;

g. if a given correlation coefficient $r^2(i,s)$ of the set of correlation coefficients for a given resource i and server s is greater than or equal to the predetermined threshold, then using the straight line curve fit to estimate a resource cost for the given resource i and server s;

h. identifying a background resource cost per transaction as $R_0(i)=m_0(i)$; and i. estimating an average foreground resource cost per transaction, using the transaction log and the formula, $$R(i)=C_{app}(i,T)/N,$$

for each of the associated system resources i from the set of system resources, where N is the number of transactions that occurred in the test period T, j. subtracting, for each system resource i of the set of system resources, the average background resource cost per transaction, $R_0(i)$, from the average foreground resource cost per transaction, $R(i)$, to obtain an average server resource cost per transaction according to the formula, $$R_{serv}(i)=R(i)+R_0(i).$$

21. The method of claim 20 including the further step of submitting the average server resource cost per transaction, $R_{serv}(i)$, to a discrete event simulator.

* * * * *